United States Patent [19]

Ledvina et al.

[11] 4,342,560
[45] Aug. 3, 1982

[54] COMPOSITE CHAIN LINK ASSEMBLY

[75] Inventors: Timothy J. Ledvina; Robert H. Mead, both of Ithaca, N.Y.

[73] Assignee: Borg-Warner Corporation, Chicago, Ill.

[21] Appl. No.: 150,370

[22] Filed: May 16, 1980

[51] Int. Cl.³ .................. F16H 55/30; F16G 13/02
[52] U.S. Cl. ........................... 474/157; 474/213
[58] Field of Search ............. 474/206, 212, 213, 214, 474/215, 216, 217, 152, 153, 155–157

[56] References Cited

U.S. PATENT DOCUMENTS

| | | | |
|---|---|---|---|
| 690,317 | 12/1901 | Renold . | |
| 1,570,272 | 1/1926 | Muller | 474/213 |
| 1,878,882 | 9/1932 | Morse . | |
| 1,947,734 | 2/1934 | Perry . | |
| 1,956,942 | 5/1934 | Belcher et al. | 474/157 |
| 2,056,602 | 10/1936 | Dull et al. | 474/157 |
| 2,223,314 | 11/1940 | Cumfer . | |
| 2,602,344 | 7/1952 | Bremer | 474/215 |
| 3,213,699 | 10/1965 | Terepin | 474/215 |
| 3,340,745 | 9/1967 | McCann | 474/213 |
| 3,377,875 | 4/1968 | Sand | 474/157 |
| 3,495,468 | 2/1970 | Griffel | 474/157 |
| 3,636,788 | 1/1972 | Jeffrey | 474/213 |
| 4,010,656 | 3/1977 | Jeffrey . | |
| 4,168,634 | 9/1979 | Griffel | 474/148 |

FOREIGN PATENT DOCUMENTS

| | | | |
|---|---|---|---|
| 143253 | 9/1951 | Australia | 474/217 |
| 55-24203 | 2/1980 | Japan | 474/156 |

*Primary Examiner*—Lawrence J. Staab
*Attorney, Agent, or Firm*—Aubrey L. Burgess

[57] ABSTRACT

A power transmission chain adapted to be used with toothed sprockets, the chain having a plurality of sets or ranks of interleaved links, the adjacent sets or ranks of which are connected by pivot means. The links of the chain each have a pair of toes separated by a crotch, each toe being defined by outside and inside flanks, the latter defining the crotch. The chain is assembled with some of the links being constructed to drivingly contact the sprocket teeth on their inside flanks and the remainder to drivingly contact the sprocket teeth on their outside flanks. The arrangement alters the normal tooth contact noise frequency.

24 Claims, 11 Drawing Figures

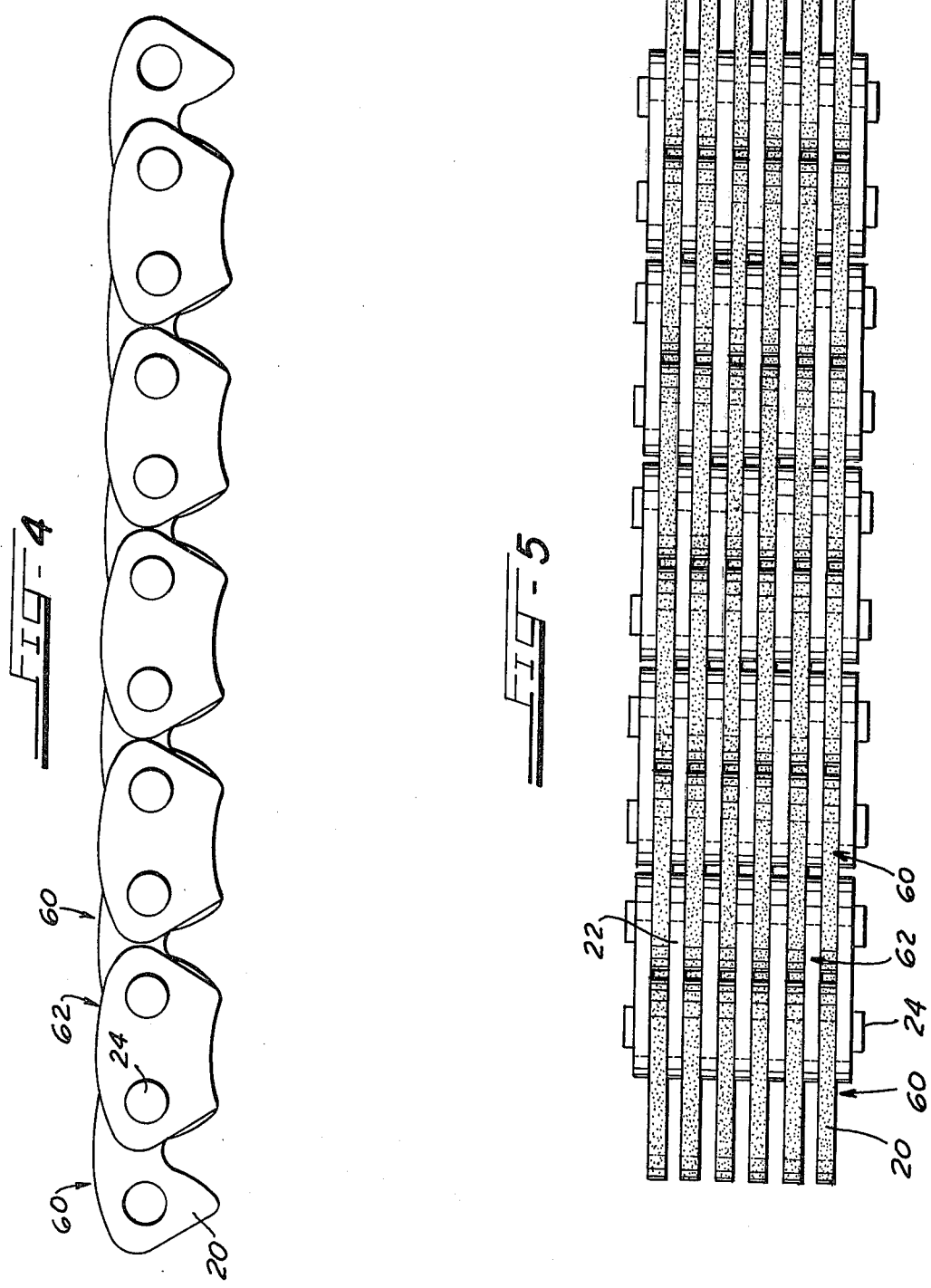

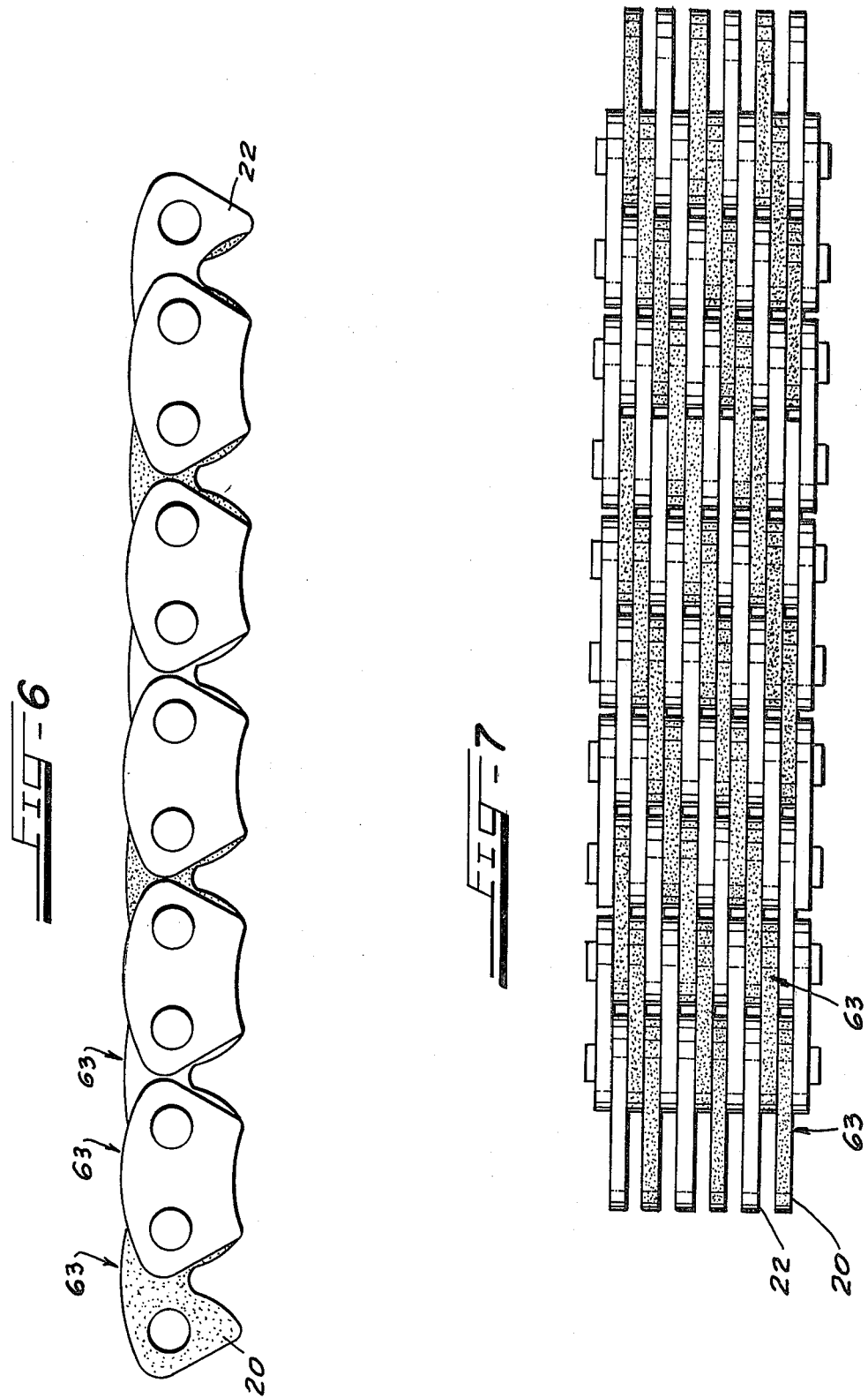

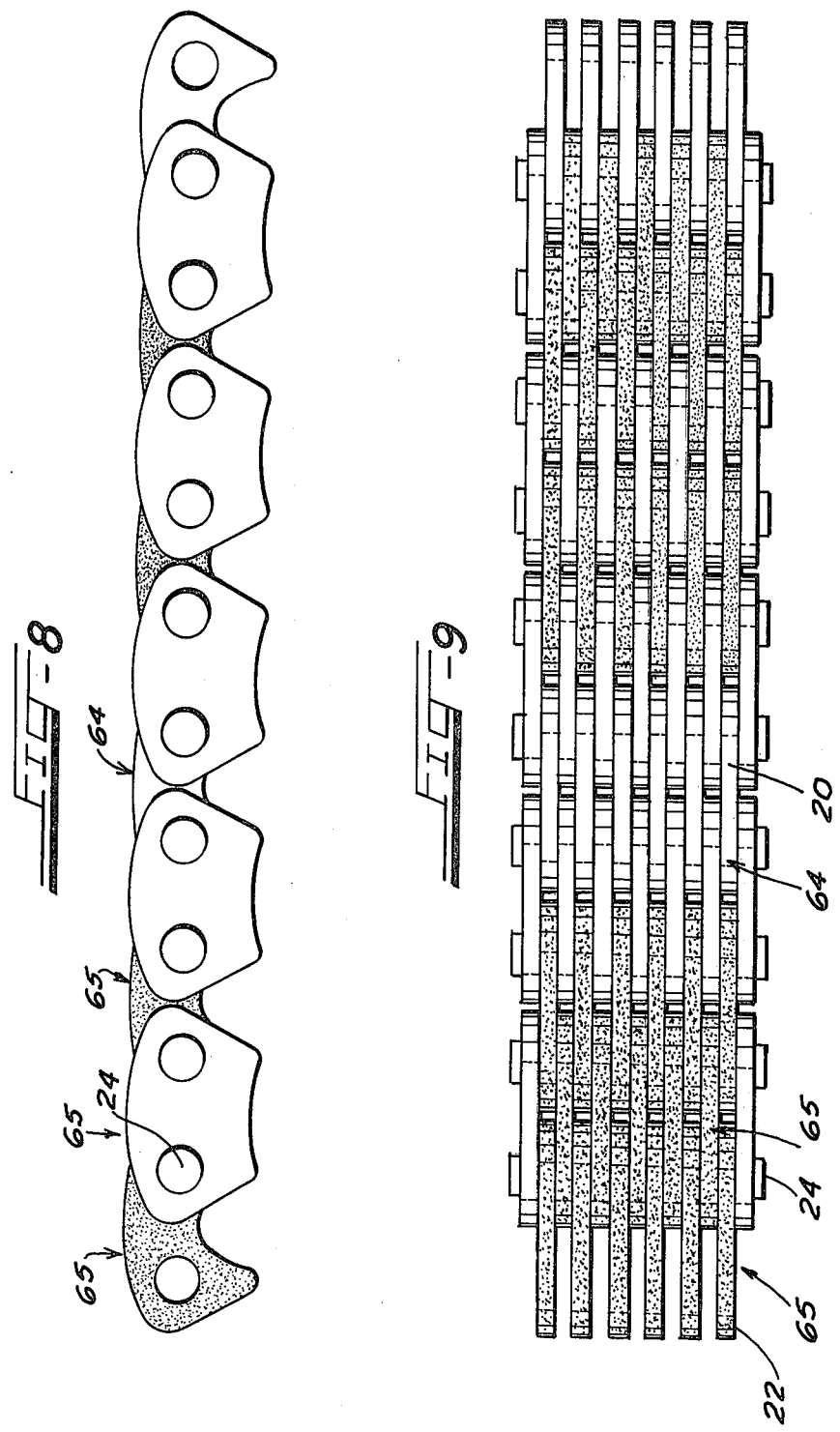

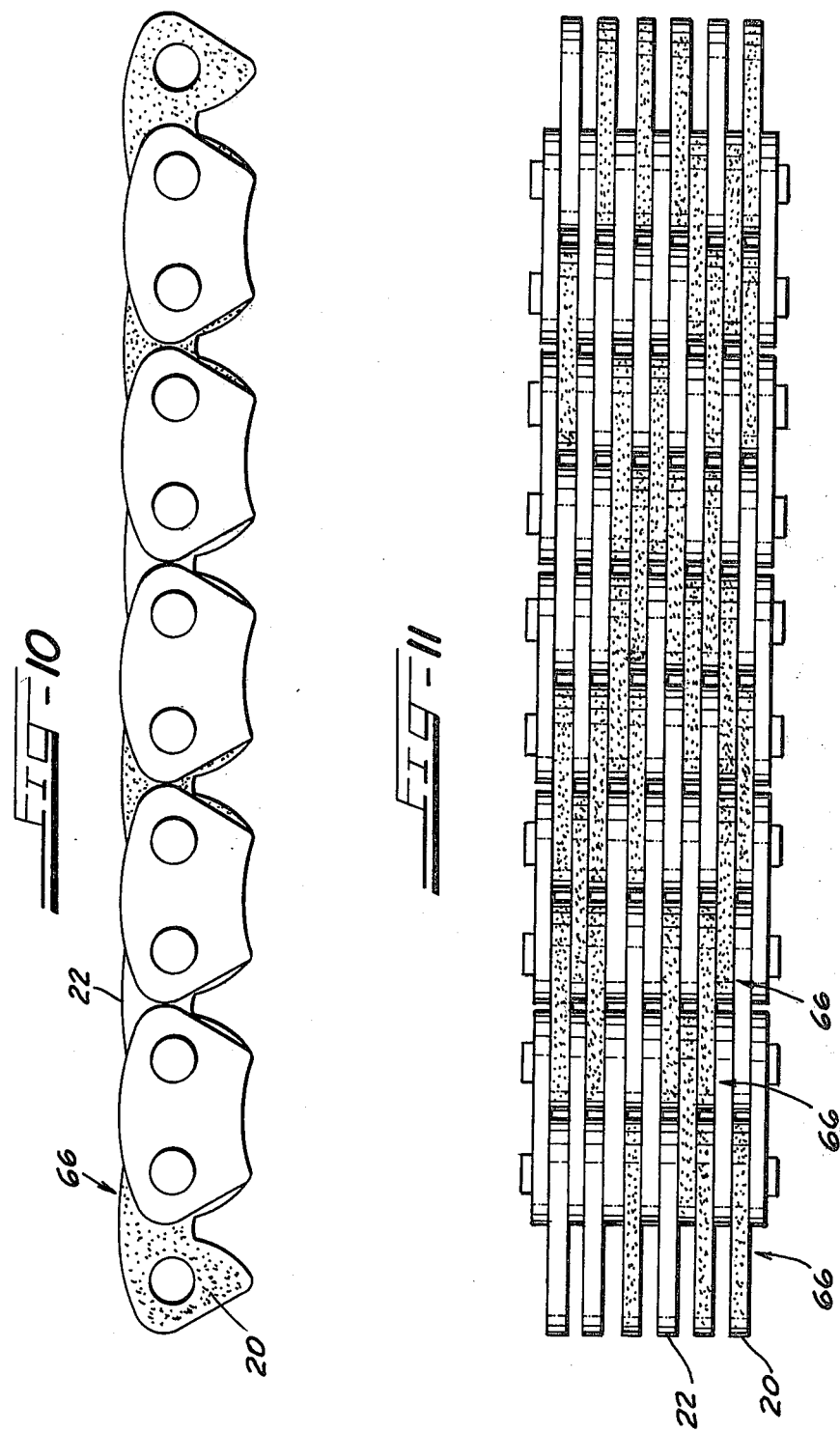

COMPOSITE CHAIN LINK ASSEMBLY

BACKGROUND OF THE INVENTION

Power transmission chains have been constructed of sets or ranks of interleaved links, the adjacent sets or ranks of which have been connected by pivot means of various cross-sections. Some of the pivot means are multiple members while others are a simple pin. The links of such chain are all generally the same, i.e., links having a pair of toes separated by a crotch, the toes being defined by outside flanks and inside flanks, the latter joining to define the crotch. Such chains have been designed to drivingly engage sprocket teeth with the inside flanks or with the outside flanks. Historically the outside flank engagement has been used with industrial power transmission type chains while the inside flank engagement has been used with automotive timing or motion transferring type chains.

One of the factors to be considered in modern automotive use is the noise generated by the impact at engagement of the chain with a sprocket. Too high a noise level is objectionable. Attempts to reduce the noise levels have been made by modifying the sprockets, either by varying the number of full size teeth on the sprockets, relieving the roots of the sprocket teeth or relieving the flanks of the sprocket teeth. Examples of such attempts are taught by U.S. Pat. Nos. 3,377,875, granted Apr. 16, 1968, 3,495,468, granted Feb. 17, 1970 and 4,168,634, granted Sept. 25, 1979, all assigned to General Motors Corporation.

THE INVENTION

The invention herein described relates to construction of various power transmission chains which are suitable for automotive uses as well as other uses and which perform at satisfactory noise levels for automotive applications. Such chains are constructed of interleaved sets or ranks of links, each link having a pair of toes defined by inside flanks which join to define a crotch and by outside flanks. In accordance with the present invention, the assembly uses two types of links, i.e., outside and inside engagement type links, in either a random or regular pattern so as to break up or alter the natural chain link-sprocket tooth engagement frequency, thereby reducing the noise level generated by the chain and sprocket drive. It is possible to construct a chain with:

1. alternate rows or pitches of inside and outside engagement type links; or
2. random mixture of various proportions of inside and outside engagement type links; or
3. random pattern by rows or pitches in various proportions of inside and outside engagement links; or
4. alternate inside and outside engagement links in every row or pitch.

Many combinations of links can be envisioned all coming within the scope of this invention.

THE DRAWINGS

FIG. 4 is an illustration of a portion of a chain with alternate sets or ranks of inside and outside flank engagement links;

FIG. 5 is a top view of the chain of FIG. 4;

FIG. 6 is a side view of a portion of a chain constructed with alternate inside and outside flank engagement links in each set or rank and with these staggered in adjacent rows;

FIG. 7 is a top view of the chain of FIG. 6;

FIG. 8 is a side view of a portion of a chain constructed of random groups of sets or ranks of inside and outside flank engagement links;

FIG. 9 is a top view of the chain of FIG. 8;

FIG. 10 is a side view of a chain of thoroughly random assembled inside and outside flank engagement links; and FIG. 11 is a top view of the chain of FIG. 10.

DETAILED DESCRIPTION

Figure 1:
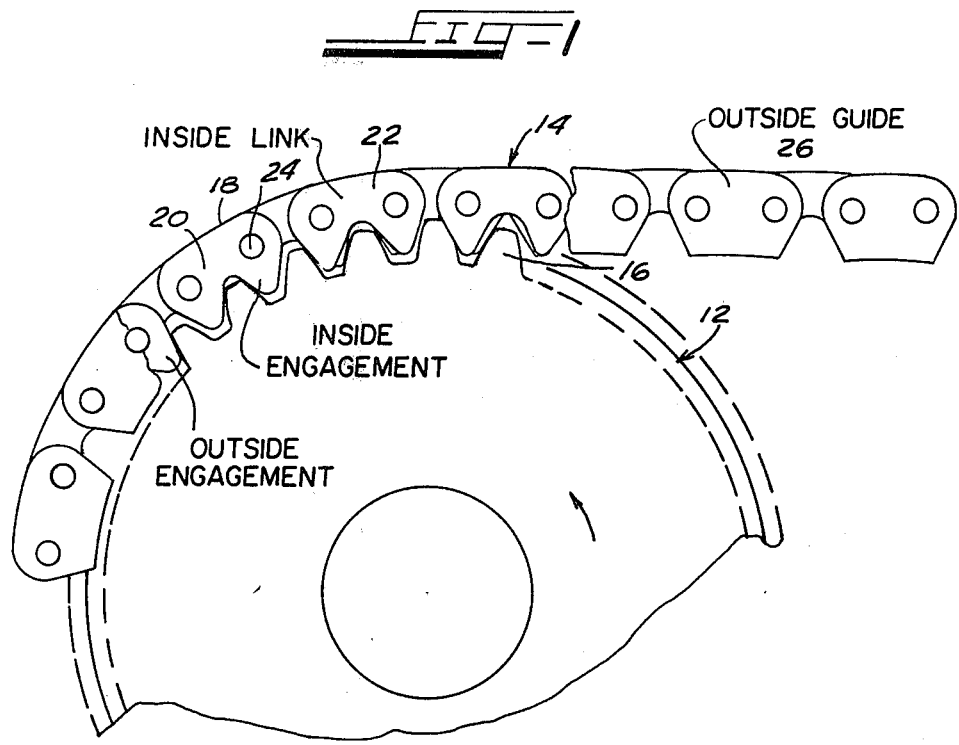
FIG. 1 is an illustration of a portion of a sprocket and a portion of a chain illustrating one arrangement of random tooth engagement, the chain having some parts broken away.

FIG. 1 illustrates a sprocket-chain drive combination comprising a sprocket 12 and a chain 14, the sprocket having a plurality of equally spaced teeth 16. The teeth may have their flanks releived as taught by the G.M. patents, supra, if necessary or desirable. The chain 14 is constructed of sets or ranks 18 of links, 20, 22, the adjacent sets of links being joined by pivot means, shown here as round pins 24. Other types of pivot means may be used where desirable.

The links 20 are of the inside flank engagement type while the links 22 are of the outside flank engagement type. Guide links 26 are used to maintain lateral alignment of the chain on the sprocket. In the actual installation of such a drive, there is a drive sprocket and a driven sprocket, drivingly connected by the chain; only one sprocket is illustrated for clarity.

Figure 2:
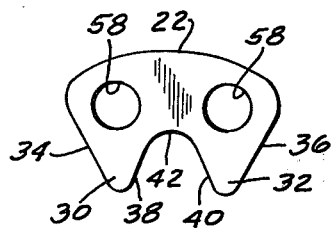
FIG. 2 is a plan view of a chain link constructed for outside flank engagement.
Figure 3:
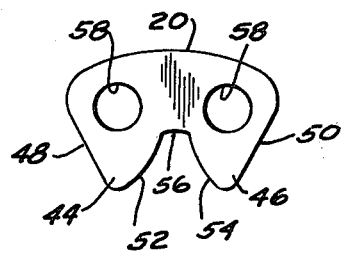
FIG. 3 is a plan view of a chain link constructed for inside flank engagement.

Attention is invited to FIGS. 2 and 3 which illustrate the link configurations. FIG. 2 is an outside flank engagement type link 22 which comprises spaced toes 30 and 32, defined by outside flanks 34 and 36 and inside flanks 38 and 40, the latter being joined by a crotch 42. The flanks 34 and 36 are generally straight for the major part of their extent.

FIG. 3 illustrates the inside engagement type link 20 which has toes 44 and 46 defined by outside flanks 48 and 50 and inside flanks 52 and 54. The inside flanks 52 and 54 are joined by a crotch 56 and are slightly curved while the outside flanks 48, 50 are generally straight.

Each of the links described has a pair of spaced apertures 58 to receive the pins 24.

The longitudinal dimension of the link 20 on a line which passes through the centers of the apertures 58, 58 is a few thousandths of an inch less than the corresponding dimension of link 22, thus insuring against outside flank engagement of the link 20. However, the center-to-center distance of the apertures 58, 58 in both link types is the same.

One arrangement of links is illustrated in FIGS. 4 and 5. The chain is constructed of alternate sets or ranks 60, 62 respectively, of inside flank engagement links 20 and outside flank engagement links 22, the adjacent ranks being joined by pivot means 24, shown as a round pin.

Another arrangement of links is illustrated in FIGS. 6 and 7, to which attention is invited. The chain is constructed with alternating inside engagement links 20 and outside engagement links 22 in each rank or set 63, the adjacent sets of which are joined by pivot means 24, also shown as a round pin.

A third arrangement of links is illustrated in FIGS. 8 and 9. Here there are random groups of ranks or sets 64, 65 constructed of inside flank engagement links 20 and outside flank engagement lines 22, respectively, the adjacent ranks being joined by pivot means 24, also shown as a round pin.

And still another arrangement of links is illustrated in FIGS. 10 and 11. Here, the sets or ranks 66 are constructed of random by assembled inside and outside flank engagement links 20, 22, respectively, the adjacent ranks being joined by pivot means 24, shown as a round pin.

It is to be understood that other arrangements of links can be used without departing from the spirit of the invention. For example, the number of links of one type as in the FIGS. 10 and 11 arrangement can be in excess of the other type or they can be equally divided.

In the automotive business, vehicles are rated on a 1 to 10 index system for component performance, noise, vibration, harshness, shade, etc. by trained observers. A typical rating system card is reproduced below:

spaced around its periphery, the links of said chain each having a pair of toes separated by a crotch and each toe being defined by an outside flank and an inside flank, the inside flanks of a link at their ends being joined to said crotch, the improvement comprising:
some of the links of said chain being so constructed and arranged to drivingly contact the teeth of the sprocket on the outside flanks of the links only and others of the links of said chain being so constructed and arranged to drivingly contact the teeth of the sprocket on the inside flanks of the links.

2. A power transmission chain and sprocket combination as recited in claim 1, wherein the links in alternate sets drivingly contact the teeth of the sprocket on the inside flanks of the links and the links in other sets drivingly contact the teeth of the sprocket on the outside flanks of the links.

3. A power transmission chain and sprocket combination as recited in claim 1, wherein the alternate links of each set of links drivingly contact the teeth of the sprocket on the inside flanks of the links and other links of each set drivingly contact the sprocket on the outside

| | VEHICLE EVALUATION RATING SYSTEM | | | | | | | | |
|---|---|---|---|---|---|---|---|---|---|
| | UNACCEPTABLE | | | | BORDER LINE ACCEPTABLE | | ACCEPTABLE | | | |
| RATING INDEX | 1 | 2 | 3 | 4 | 5 | 6 | 7 | 8 | 9 | 10 |
| EVALUATION OF ANY PARTICULAR VEHICLE COMPONENT PERFORMANCE | POOR | | | CUSTOMER COMPLAINT | BORDER LINE | BARELY ACCEPTABLE | FAIR | GOOD | VERY GOOD | EXCELLENT |
| NOISE, VIBRATION, HARSHNESS, SHAKE ETC. | NOT ACCEPTABLE | | | OBJECTIONABLE | REQUIRES IMPROVEMENT | MEDIUM | LIGHT | VERY LIGHT | TRACE | NOT NOTICEABLE |
| CONDITION NOTED BY | ALL CUSTOMERS | | | AVERAGE CUSTOMER | CRITICAL CUSTOMER | | TRAINED OBSERVER | | | NOT PERCEPTIBLE |
| PROCEDURE | REQUIRES ACTION | | | | INVESTIGATION REQUIRED | | ACCEPT | | | CHECK RESULTS |

It is believed that the rating system is self-explanatory. The rating is usually done by trained observers.

A chain such as illustrated in FIGS. 4 and 5 was tested in a G.M. X-body vehicle by replacing an OEM power transmission chain without change of the OEM sprockets. The OEM chain was of the type disclosed in Jeffrey U.S. Pat. No. 4,010,656, issued Mar. 8, 1977. Both chains were of the same pitch and width and had substantially the same length. The noise level was rated about 6½ for each chain.

A round pin chain constructed with inside flank engagement links only was also installed on the same sprockets. The noise level was rated about 4+ to 6 by observers.

The chain of this invention is less expensive to manufacture than the OEM chain and possesses sufficient strength for the drive.

The noise rating of the chain according to this invention which was tested, is better than the conventional chain, also tested.

We claim:

1. A power transmission chain and sprocket combination having a plurality of ranks or sets of interleaved links, pivot means connecting the adjacent ranks or sets of links to permit the articulation of the chain, and a sprocket having a plurality of teeth substantially equally flanks of the links.

4. A power transmission chain and sprocket combination as recited in claim 1, wherein there is a random distribution of sets of links, some sets having all links drivingly contacting the teeth of the sprocket on the inside flanks of the links and other sets having all links drivingly contacting the teeth of the sprocket on their outside flanks.

5. A power transmission chain and sprocket combination as recited in claim 1, wherein there is a random distribution of links in each set of links drivingly contacting the teeth of the sprocket on the inside and outside flanks of the links.

6. The method of making a power transmission chain for use with a toothed sprocket having a plurality of sets or ranks of interleaved links, each of which has a pair of toes defined by outside and inside flanks, the inside flanks of each link being joined by a waisted crotch, said chain adapted to be drivingly associated with a toothed sprocket, comprising providing a plurality of links, some of which are so constructed and arranged to contact the teeth of a sprocket on the outside flanks of the links only and others of which are so constructed and arranged to contact the teeth of a sprocket on the inside flanks of the links, assembling said links as sets in a manner in which some of the links have inside flank engagement and others of the links have outside flank engagement, and joining adjacent sets with a pivot means.

7. A power transmission chain composed of a plurality of interleaved sets of links, pivot means connecting adjacent sets of links, the links of said chain each having a pair of toes separated by a crotch, the toes being defined by outside flanks and inside flanks, the inside flanks of each link being joined at the crotch, and each link defining a pair of apertures for receiving said pivot means, some sets of links being composed of links having substantially straight inside and outside flanks and other sets of links being composed of links having inside flanks of a different configuration.

8. A power transmission chain as recited in claim 7 wherein said some sets of links and said other sets of links alternate with one another.

9. A power transmission chain as recited in claim 7 wherein said some sets of links are randomly arranged with said other sets of links.

10. A power transmission chain and sprocket combination having a plurality of ranks or sets of interleaved links, pivot means connecting the adjacent ranks or sets of links to permit articulation of the chain, and a sprocket having a plurality of teeth substantially equally spaced around its periphery, the links of said chain each having a pair of toes separated by a crotch and each toe being defined by an outside flank and an inside flank, the inside flanks of a link at their ends being joined to said crotch, the improvement comprising:

some of the links of said chain being so constructed and arranged to drivingly contact the teeth of the sprocket on the outside flanks of the links and others of the links of said chain being so constructed and arranged to drivingly contact the teeth of the sprocket on the inside flanks only of the links.

11. A power transmission chain and sprocket combination is recited in claim 10, wherein the links in alternate sets drivingly contact the teeth of the sprocket on the inside flanks of the links and the links in other sets drivingly contact the teeth of the sprocket on the outside flanks of the links.

12. A power transmission chain and sprocket combination as recited in claim 10, wherein the alternate links of each set of links drivingly contact the teeth of the sprocket on the inside flanks of the links and other links of each set drivingly contact the sprocket on the outside flanks of the links.

13. A power transmission chain and sprocket combination as recited in claim 10 wherein there is a random distribution of sets of links, some sets having all links drivingly contacting the teeth of the sprocket on the inside flanks of the links and other sets having all links drivingly contacting the teeth of the sprocket on the outside flanks of the links.

14. A power transmission chain and sprocket combination as recited in claim 10 wherein there is a random distribution of links in each set of links drivingly contacting the teeth of the sprocket on the inside and outside flanks of the links.

15. A power transmission chain composed of a plurality of interleaved sets of links, pivot means connecting adjacent sets of links, the links of said chain each having a pair of toes separated by a crotch, each toe being defined by diverging outside and inside flanks, the inside flanks of each link being joined at the crotch, and each link defining a pair of apertures for receiving said pivot means, some sets of links being composed of links having substantially straight inside and outside flanks and other sets of links being composed of links having arcuate inside flanks.

16. The method of making a power transmission chain for use with a toothed sprocket having a plurality of sets or ranks of interleaved links, each of which has a pair of toes defined by outside and inside flanks, the inside flanks of each links being joined by a waisted crotch, said chain adapted to be drivingly associated with a toothed sprocket, comprising providing a plurality of links, some of which are so constructed and arranged to contact the teeth of a sprocket on the outside flanks of the links and some of which are so constructed and arranged to contact the teeth of a sprocket on the inside flanks of the links only, assembling said links as sets in a manner in which some of the links have inside flank engagement and others of the links have outside flank engagement, and joining adjacent sets with a pivot means.

17. A power transmission chain suitable for use with a sprocket having a plurality of teeth equally spaced about its periphery, the chain being composed of a plurality of interleaved sets of links, pivot means connecting adjacent sets of links, the links of said chain each having a pair of toes separated by a crotch, each toe being defined by diverging outside and inside link flanks, at least one flank of each link being adapted for driving engagement with the sprocket teeth, the inside flanks of each link being joined at the crotch, and each link defining a pair of apertures for receiving said pivot means, some of the links of the chain having substantially straight outside flank configuration and being so constructed and arranged to drivingly contact the teeth of the sprocket on the outside flanks of the links only, and others of said links having sprocket tooth engaging inside flanks of a configuration different from said straight configuration.

18. A power transmission chain as recited in claim 17 wherein each set of links has alternate links having substantially straight inside and outside flanks and links having inside flanks of a different configuration.

19. A power transmission chain as recited in claim 17, wherein said pivot means is a round pin.

20. A power transmission chain as recited in claim 17 wherein said different configuration is a curved surface facing inwardly of said link.

21. A power transmission chain composed of a plurality of interleaved sets of links, pivot means connecting adjacent sets of links, the links of said chain each having a pair of toes separated by a crotch, each toe being defined by diverging outside and inside link flanks, the inside flanks of each link being joined at the crotch, and each link defining a pair of apertures for receiving said pivot means, said chain being composed of randomly arranged links having substantially straight inside and outside flanks for the major portion of their lengths, and links having inside flanks of a different configuration.

22. A power transmission chain and sprocket combination comprising:
a plurality of links, pivot means connecting the links to permit articulation of the chain, and a sprocket having a plurality of teeth around its periphery, the links of said chain each having a pair of toes separated by a crotch, each toe being defined by an outside flank and an inside flank, some of the links of said chain being so constructed and arranged to drivingly contact the teeth of the sprocket on the outside flanks of the links only and others of the links of said chain being so constructed and arranged to drivingly contact the teeth of the sprocket on the inside flanks of the links.

23. A power transmission chain and sprocket combination comprising:
a plurality of links, pivot means connecting the links to permit articulation of the chain, and a sprocket having a plurality of teeth around its periphery, the links of said chain each having a pair of toes separated by a crotch, each toe being defined by an outside flank and an inside flank, some of the links of said chain being so constructed and arranged to drivingly contact the teeth of the sprocket on the outside flanks of the links and others of the links being so constructed and arranged to drivingly contact the teeth of the sprocket on the inside flanks only of the links.

24. A power transmission chain composed of a plurality of interleaved sets of links, pivot means connecting adjacent sets of links, the links of said chain each having a pair of toes separated by a crotch, each toe being defined by outside flanks and inside flanks, the inside flanks of each link being joined at the crotch, and each link defining a pair of apertures for receiving said pivot means, some sets of links being composed of links having substantially straight inside flanks and other sets of links being composed of links having inside flanks of a different configuration.

* * * * *